(12) United States Patent  
Zhu et al.

(10) Patent No.: US 8,953,662 B1  
(45) Date of Patent: Feb. 10, 2015

(54) METHOD AND APPARATUS FOR BAUD RATE TRACKING

(71) Applicant: Marvell International Ltd., Hamilton (BM)

(72) Inventors: Jianhua Zhu, Shanghai (CN); Wei (George) Zhang, Shanghai (CN); Enqin Zhang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 143 days.

(21) Appl. No.: 13/664,929

(22) Filed: Oct. 31, 2012

Related U.S. Application Data

(60) Provisional application No. 61/557,263, filed on Nov. 8, 2011.

(51) Int. Cl.
*H04B 1/38* (2006.01)

(52) U.S. Cl.
USPC .......................................... 375/220; 375/316

(58) Field of Classification Search
CPC ... H04L 12/2801; H04L 1/20; H04L 25/0262; H04L 5/1446; H04L 27/2655; G06F 15/7853; G06F 13/38; H04W 72/085
USPC ................................................ 375/220, 316
See application file for complete search history.

(56) References Cited

U.S. PATENT DOCUMENTS

| 7,342,984 B1* | 3/2008 | Yearsley et al. ............... 375/354 |
| 2008/0288660 A1* | 11/2008 | Balasubramanian et al. .... 710/2 |
| 2012/0297233 A1* | 11/2012 | Ross ............................ 713/502 |

* cited by examiner

*Primary Examiner* — Leila Malek

(57) ABSTRACT

Aspects of the disclosure provide a method. The method includes capturing values of a timer in response to a first transition edge and a second transition edge of a received signal transmitted from an external device to determine a counted number by the timer corresponding to a pre-known number of symbols between the first and second transition edges in the received signal, and determining a baud rate configuration based on a ratio of the counted number and the pre-known number of symbols.

17 Claims, 3 Drawing Sheets

METHOD AND APPARATUS FOR BAUD RATE TRACKING

INCORPORATION BY REFERENCE

This present disclosure claims the benefit of U.S. Provisional Application No. 61/557,263, "Baudrate Auto-Tracking for Serial Communication" filed on Nov. 8, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A microcontroller can be implemented on an integrated circuit (IC) chip. In an example, the IC chip includes a processor and a non-volatile memory storing firmware to be executed by the processor. Occasionally, the firmware may need to be updated to add features or fix bugs, for example.

SUMMARY

Aspects of the disclosure provide a method. The method includes capturing values of a timer in response to a first transition edge and a second transition edge of a received signal transmitted from an external device to determine a counted number by the timer corresponding to a pre-known number of symbols between the first and second transition edges in the received signal, and determining a baud rate configuration based on a ratio of the counted number and the pre-known number of symbols.

In an example, the method further includes counting by the timer in response to a clock signal. Then, the method includes storing a value determined based on the ratio, and communicating with the external device based on the clock signal and the value. Further, in an embodiment, the method includes updating a programmable memory based on the communication with the external device.

According to an aspect of the disclosure, the method includes receiving the signal via a universal asynchronous receiver/transmitter (UART) interface. Further, in an embodiment, the method includes capturing the values of the timer in response to the first transition edge and the second transition edge of the received signal during a booting process.

In addition, in an example, the method includes capturing the values of the timer in response to a plurality of transition edges of the received signal to determine a plurality of counted numbers corresponding to a plurality of pre-known numbers of symbols, averaging ratios of the plurality of transition edges and the corresponding plurality of pre-known numbers of symbols.

Aspects of the disclosure provide a circuit. The circuit includes a timer, and an interface circuit. The timer is configured to count based on a clock signal, and to capture counted values in response to a first transition edge and a second transition edge of a received signal transmitted from an external device to determine a counted number by the timer corresponding to a pre-known number of symbols between the first transition edge and the second transition edge. The interface circuit is configured to communicate with the external device based on a baud rate configuration that is determined based on a ratio of the counted number and the pre-known number of symbols.

Further, in an embodiment, the circuit includes a memory is configured to store a value determined based on the ratio. Then, the interface circuit is configured to operate based on the clock signal and communicate with the external device based on the stored value that is indicative of the baud rate configuration.

Aspects of the disclosure provide a circuit having a non-volatile memory. The non-volatile memory is configured to store software codes to be executed by a processor: to cause a timer that counts based on a clock signal to capture counted values in response to a first transition edge and a second transition edge of a received signal transmitted from an external device, to determine a counted number corresponding to a pre-known number of symbols between the first transition edge and the second transition edge, and to cause a baud rate configuration to be determined based on a ratio of the counted number and the pre-known number of symbols.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
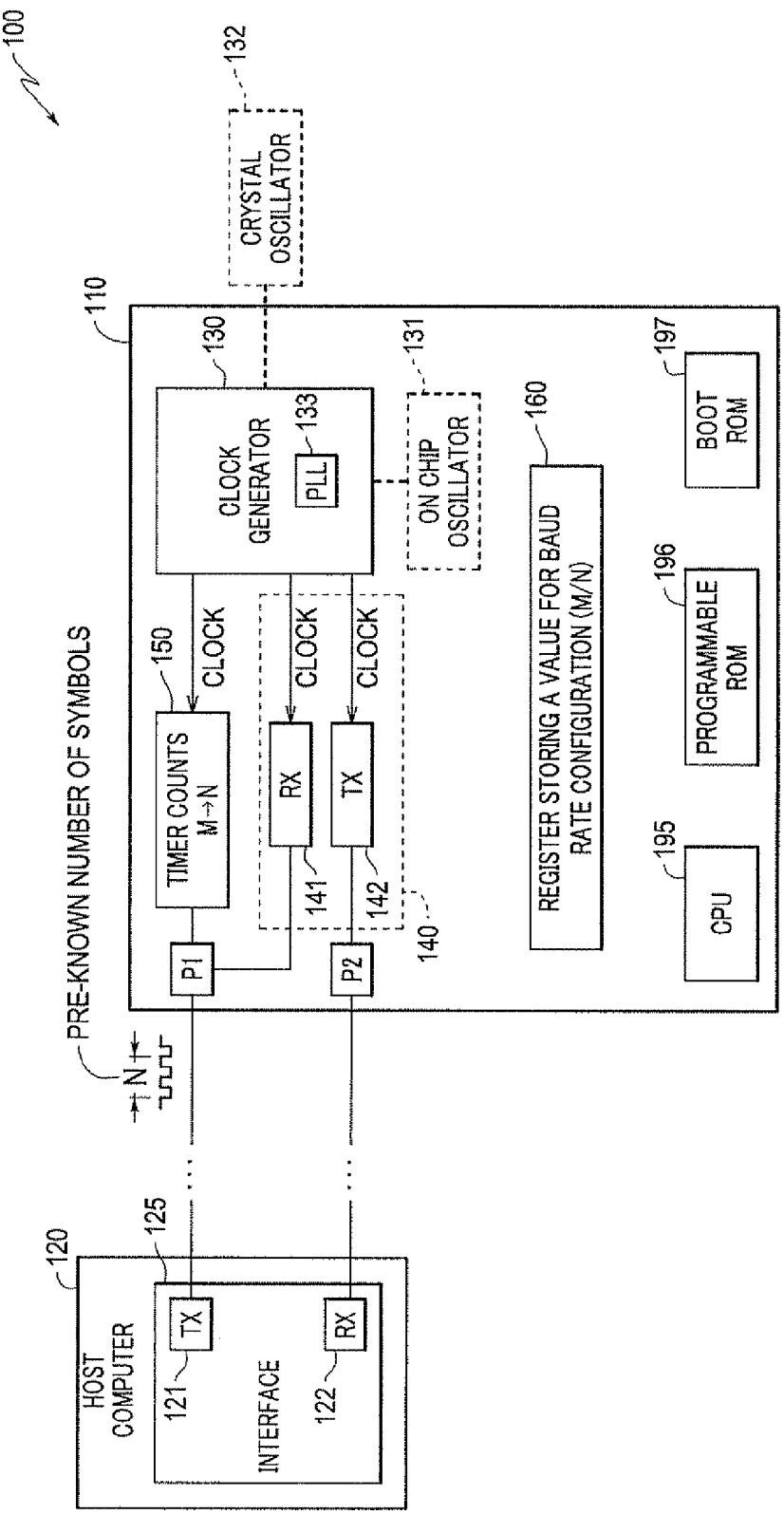
FIG. 1 shows a block diagram of a system example 100 according to an embodiment of the disclosure.

FIG. 1 shows a block diagram of a system example 100 according to an embodiment of the disclosure. The system 100 includes two devices that setup a communication channel of matched baud rates based on a signal of a pre-known format and a timer. In the FIG. 1 example, the system 100 includes a host computer 120 and an integrated circuit (IC) chip 110. The IC chip 110 includes a timer 150 configured to count based on a clock signal CLOCK on the IC chip 110, and to capture counted values in response to a signal sent from the host computer 120. The signal has a pre-known format. Based on the counted values and the pre-known format of the signal, the IC chip 110 configures itself of a substantially same baud rate as the host computer 120 to enable further communication with the host computer 120.

In an example, the IC chip 110 is a microcontroller 110. The microcontroller 110 includes a processor, such as a central processing unit (CPU) 195, and non-volatile on-chip memories, such as a programmable read only memory (ROM) 196, a boot ROM 197, and the like. According to an embodiment of the disclosure, the boot ROM 197 stores booting codes to be executed by the CPU 195 during a booting process, such as at the time the microcontroller 110 is just powered on. The boot ROM 197 can be implemented using any type of non-volatile memory, such as ROM, electrically programmable read only memory (EPROM), electrically erasable programmable read-only memory (EEPROM), flash memory, and the like.

The programmable ROM 196 stores on-chip codes, such as firmware, and the like, that can be executed by the CPU 195, such that the microcontroller 110 performs desired functions. The programmable ROM 196 can be implemented using any type of non-volatile memory that can be updated, such as EPROM, EEPROM, flash memory, and the like.

In an example, the on-chip codes in the programmable ROM 196 may need to be updated to add features or fix bugs. According to an embodiment of the disclosure, the booting codes in the boot ROM 197 are executed by the CPU 195 to setup communication between the microcontroller 110 and an external device, such as the host computer 120. Then, the host computer 120 communicates with the microcontroller 110 to update the on-chip codes stored in the programmable ROM 196.

It is noted that, in an embodiment, the microcontroller 110 also includes random access memory (RAM) (not shown). In an example, codes, such as the booting codes, firmware, and the like, are loaded into the RAM and then the CPU 195 executes the codes from the RAM.

According to an embodiment of the disclosure, the microcontroller 110 includes an interface 140 configured to enable communication with the external device. In an example, the interface 140 is a universal asynchronous receiver/transmitter (UART) interface 140. The host computer 120 also includes an interface 125, such as a UART interface 125, that is suitably coupled with the interface 140.

In the FIG. 1 example, the UART interface 140 includes a receiving portion RX 141 and a transmitting portion TX 142, and the UART interface 125 includes a receiving portion RX 122 and a transmitting portion TX 121. The RX 141 is suitably coupled with the TX 121 and the TX 142 is suitably coupled with the RX 122.

It is noted that, in an embodiment, the TX 121 and the RX 122 are respectively coupled with the RX 141 and the TX 142 via additional components. In an example, the RX 141 is coupled to a pad P1 of the IC chip 110, and the TX 142 is coupled to a pad P2 of the IC chip 110. Further, the IC chip 110 is assembled in a package (not shown), and the package is further assembled on a printed circuit board (PCB) board (not shown). The PCB board includes an RS-232 connector (not shown) that is coupled to the RX 141 and the TX 142 via the pads P1 and P2. The host computer 120 also includes an RS-232 connector (not shown) that is coupled with the TX 121 and the RX 122. Then, the two RS-232 connectors are suitably connected by wires, for example.

According to an aspect of the disclosure, the booting codes stored in the boot ROM 197 are executed by the CPU 195 to determine a baud rate configuration for the interface 140 of the microcontroller 110. When the interface 140 of the microcontroller 110 is configured according to the baud rate configuration, the interface 140 has a matching baud rate with the interface 125 of the host computer 120, and then the microcontroller 120 can further communicate with the host computer 120.

In an example, the host computer 120 can configure the interface 125 according to one of a plurality of baud rates, such as 9,600, 19,200, 38,400, 57,600, 115,200 symbols per second, for communication.

Further, the baud rate of the interface 140 depends on the clock frequency of the clock signal CLOCK that is used by the microcontroller 110, and a baud rate configuration. In an example, the microcontroller 110 includes a clock generator 130 to generate the clock signal CLOCK. The clock signal CLOCK is then provided to various components in the microcontroller 110, such as the interface 140, the CPU 195, and the like. Further, in an example, the baud rate of the interface 140 is equivalent to a result of dividing the clock frequency by a value. The value can be changed to change the baud rate of the interface 140, and is indicative of the baud rate configuration of the interface 140.

According to an embodiment of the disclosure, the clock frequency of the clock signal CLOCK is configurable. In an example, the microcontroller 110 can be configured to select one of an internal oscillation signal and an external oscillation signal as a reference signal to generate the clock signal CLOCK. For example, the microcontroller 110 includes an on-chip oscillator 131 that provides the internal oscillation signal to the clock generator 130. Further, a crystal oscillator 132 that is external to the microcontroller 110 can provide the external oscillation signal to the clock generator 130. The external oscillation signal and the internal oscillation signal may have different oscillation frequencies.

In addition, in an embodiment, the clock generator 130 includes a phase-locked loop (PLL) 133 to generate the clock signal with reference to a selected oscillation signal from the internal oscillation signal and the external oscillation signal. In an example, the PLL 133 includes a configurable frequency divider (not shown) such that the frequency of the clock signal CLOCK is one of a plurality of multiple times of the selected oscillation signal.

Thus, in an example, the baud rate configuration for matching the baud rate of the microcontroller 110 to the host computer 120 depends on the baud rate of the host computer 120 and the clock frequency of the microcontroller 110.

According to an aspect of the disclosure, the booting codes stored in the boot ROM 197 are executed by the CPU 195 to determine a ratio of the CLOCK frequency used by the microcontroller 110 and the baud rate used by the host computer 120, and then the baud rate configuration is determined based on the ratio and a value that is indicative of the baud rate configuration is stored in the register 160. Based on the baud rate configuration, the interface 140 has a matching baud rate with the interface 125. The matching baud rates enable further communicates between the microcontroller 110 and the host computer 120.

In an example, when the microcontroller 110 is just powered up, the clock signal CLOCK is generated based on a clock signal configuration that selects the source of the reference signal and also selects the configuration for the frequency divider in the PLL 133. The clock signal CLOCK is provided to various components of the microcontroller 110, such as the CPU 195, the timer 150 and the interface 140.

According to an embodiment of the disclosure, the timer 150 times based on the clock signal CLOCK. In an example, the timer 150 counts up by one in response to a rising edge of the clock signal CLOCK, and the counted value is indicative of clock cycles of the clock signal CLOCK.

According to an aspect of the disclosure, the timer 150 is coupled to the pad P1 at the time of chip power-up, and the counted values are captured in response to the signal received at the pad P1 to determine the baud rate configuration.

In an example, when the IC chip 110 is initially powered up, the host computer 120 transmits a signal of a pre-known format by the TX 121 to the microcontroller 110, and the RX 122 of the host computer 120 listens for a return signal from the microcontroller 110, such as a return signal of the pre-known format. When the host computer 120 has not received the return signal for a time duration, the host computer 120 retransmits the signal of the pre-know format by the TX 121. This process repeats until the host computer 120 receives the return signal.

According to an aspect of the disclosure, the signal of the pre-known format has at least two transition edges, and the number (N) of symbols between the two transition edges is pre-known. The timer values are captured in response to the two transition edges, and the counted number (M) in a time duration between the two transition edges can be determined.

Thus, the ratio of the clock frequency used by the microcontroller 110 and the baud rate used by the host computer 120 can be determined based the ratio of M and N.

Specifically, in an example, the time duration between the two transition edges is respectively represented by the right side and the left side of Eq. 1:

$$\frac{N}{BR_{HOST}} = \frac{M}{F_{CLOCK}} \qquad \text{Eq. 1}$$

where $BR_{HOST}$ is the baud rate of the host computer 120 and $F_{CLOCK}$ is the clock frequency of the clock signal CLOCK. Thus, the ratio of the clock frequency used by the microcontroller 110 and the baud rate used by the host computer 120 can be determined based on Eq. 2:

$$\frac{F_{CLOCK}}{BR_{HOST}} = \frac{M}{N} \qquad \text{Eq. 2}$$

Thus, in an example, the baud rate configuration of the interface 140 is determined based on ratio of M and N, and the ratio of M and N is stored in the register 160 to indicate the baud rate configuration. Then, in the example, the interface 140 transmits a return signal of the pre-known format to the host computer 120 according to a baud rate that is equivalent to a result of dividing the clock frequency by the stored value in the register 160, which matches the baud rate of the host computer 120. The interface 140 also processes, such as samples, received signals from the host computer 120 according to the baud rate that is equivalent to a result of dividing the clock frequency by the stored value in the register 160.

When the host computer 120 successfully receives the return signal of the pre-known format from the microcontroller 110, the interface 125 and the interface 140 have matched their baud rates, and the host computer 120 and the microcontroller 110 can perform any further communication via the interface 125 and the interface 140. In an example, a user may use the host computer 120 to update the on-chip codes stored in the programmable ROM 196.

Figure 2:
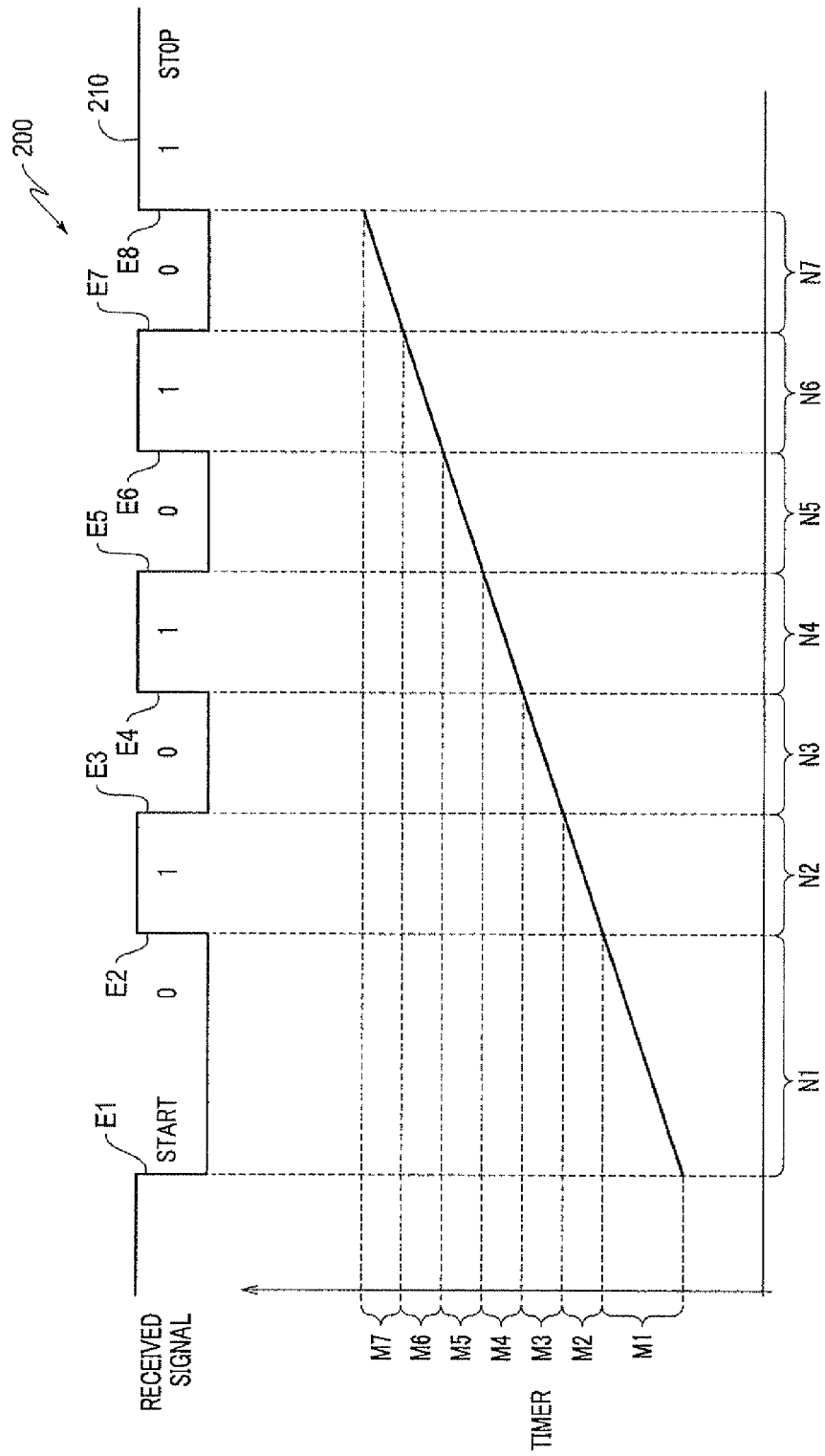
FIG. 2 shows a plot example 200 according to an embodiment of the disclosure.

FIG. 2 shows a plot example 200 illustrating the operations of the timer 150 in response to a received signal according to an embodiment of the disclosure. The plot 200 includes a waveform 210 for the received signal, such as corresponding to a voltage on the pad P1. The received signal includes a frame of data of a pre-known format.

In the FIG. 2 example, the frame has a start symbol, pre-known eight bits (e.g., 01010101), and a stop symbol. Specifically, in an example, when the TX 121 is idle, the pad P1 has a relatively high level of voltage. Thus, when the voltage on the pad P1 has a falling edge (as shown by E1) that the voltage level transits from the relatively high level of voltage to a relatively low voltage, and keeps the relatively low voltage for a time duration, the pad P1 receives the start symbol. In an example, following the start symbol, the received signal includes eight bits of data that is pre-known. In the FIG. 2 example, the eight bits are "01010101" that cause the pad P1 to receive transition edges E2-E8. Following the eight bits data, the received signal keeps the relatively high level of the voltage for a time duration that indicates the pad P1 receives the stop symbol.

Because of the pre-known format and the pre-known data, the number of symbols between the transition edges is pre-known. For example, there are N1 (2) symbols between E1 and E2, N2 (1) symbols between E2 and E3, N3 (1) symbols between E3 and E4, so on so forth.

The timer value of the timer 150 is captured in response to the transition edges, and then the counted number by the timer 150 corresponding to the number of symbols between the transition edges is calculated. For example, the timer 150 has counted M1 between E1 and E2, counted M2 between E2 and E3, counted M3 between E3 and E4, etc.

In an example, based on the counted numbers and the corresponding pre-known numbers of symbol, the microcontroller 110 determines ratios of the counted numbers and the pre-known numbers symbol, such as a ratio of M1 and N1, a ratio of M2 and N2, a ratio of M3 and N3, and the like. Further, the microcontroller 110 determines an average ratio of the ratios.

Figure 3:
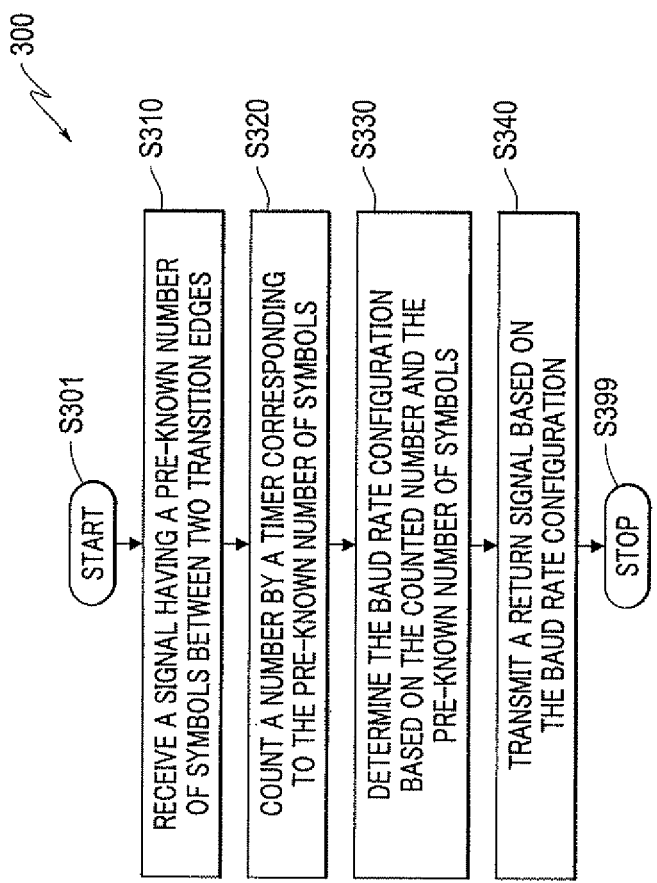
FIG. 3 shows a flow chart outlining a process example 300 according to an embodiment of the disclosure.

FIG. 3 shows a flow chart outlining a process example 300 executed by the microcontroller 110 to match a baud rate of the microcontroller 110 with the baud rate of the host computer 120 according to an embodiment of the disclosure. In an example, when the microcontroller 110 is powered on, the booting codes in the boot ROM 197 are executed by the CPU 195 to control various components of the microcontroller 110 to perform the process 300. The process starts at S301, and proceeds to S310.

At S310, a signal from the host computer 120 is received by the microcontroller 110. The signal is indicative of a time duration of a pre-known number of symbols. In an example, the host computer 120 is coupled to the microcontroller 110 via the UART interface 125 and the UART interface 140. Then, the TX 121 transmits the signal of a pre-known format, such as the format shown in FIG. 2, to the microcontroller 110 according to the baud rate of the host computer 120. In an example, the signal includes at least two transition edges, such as a first transition edge and a second transition edge, and the number of symbols between the two transition edges is pre-known. Then, the host computer 120 monitors whether a return signal of the pre-know format is received by the RX 122. If the RX 122 has not received the return signal in a time duration, the TX 121 transmits again the signal of the pre-known format.

At S320, the microcontroller 110 determines a counted number by the timer 150 corresponding to the pre-know number of symbols. In an example, when the microcontroller 110 is powered on, the clock generator 130 provides the clock signal CLOCK to the timer 150. The timer 150 counts up by one in response to a rising edge of the clock signal CLOCK. The timer 150 is coupled to the pad P1, and the timer value is captured in response to transition edges in the received signal. For example, a first timer value is captured in response to the first transition edge, and a second timer value is captured in response to the second transition edge. The difference between the first timer value and the second timer value is the counted number by the timer 150 corresponding to the pre-known number of symbols.

At S330, the microcontroller 110 determines a baud rate configuration based on the counted number and the pre-known number of symbols. In an example, the ratio of the counted number and the pre-known number of symbols is indicative of a ratio of the clock frequency of the microcontroller 110 and the baud rate of the host computer 120 for matching. In an example, the ratio is stored in the register 160 to indicative the baud rate configuration for the interface 140 to match the baud rate of the interface 125.

At S340, a return signal is transmitted based on the baud rate configuration. In an example, the TX 142 transmits the return signal having the pre-known format according to the baud rate configuration. When the RX 122 successfully receives the return signal, the interface 125 and the interface 140 have matching baud rate, and the microcontroller 110 and the host computer 120 can further communicate via the interface 125 and the interface 140. For example, the host computer 120 can update the firmware stored in the programmable ROM 196. Then, the process proceeds to S399 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
capturing values of a timer in response to a plurality of first transition edges and a plurality of second transition edges of a received signal transmitted from an external device to determine a plurality of counted numbers by the timer corresponding to a plurality of pre-known number of symbols between first and second transition edges in the received signal;
determining ratios of the plurality of counted numbers and the corresponding plurality of pre-known numbers of symbols;
determining an average ratio of the ratios using a processor; and
determining a baud rate configuration based on the averaged ratio.

2. The method of claim 1, further comprising:
counting by the timer in response to a clock signal.

3. The method of claim 2, further comprising:
storing a value determined based on the average ratio; and
communicating with the external device based on the clock signal and the value.

4. The method of claim 3, further comprising:
updating a programmable memory based on the communication with the external device.

5. The method of claim 1, further comprising:
receiving the signal via a universal asynchronous receiver/transmitter (UART) interface.

6. The method of claim 1, wherein
capturing the values of the timer in response to the plurality of first transition edges and the plurality of second transition edges of the received signal during a booting process.

7. A circuit, comprising:
a timer configured to count based on a clock signal, and to capture counted values in response to first transition edges and second transition edges of a received signal transmitted from an external device to determine a plurality of counted numbers by the timer corresponding to a plurality of pre-known number of symbols between the first transition edges and the second transition edges; and
an interface circuit configured to communicate with the external device based on a baud rate configuration that is determined based on an average ratio of the plurality of counted numbers and the plurality of pre-known number of symbols.

8. The circuit of claim 7, wherein
a memory is configured to store a value determined based on the average ratio; and
the interface circuit is configured to operate based on the clock signal and communicate with the external device based on the stored value that is indicative of the baud rate configuration.

9. The circuit of claim 7, further comprising:
a programmable memory to be updated based on the communication with the external device.

10. The circuit of claim 7, wherein the interface circuit is a serial communication interface.

11. The circuit of claim 7, wherein the interface circuit is a universal asynchronous receiver/transmitter (UART) interface.

12. The circuit of claim 7, wherein
the timer is configured to capture the counted values in response to the first transition edge and the second transition edge of the received signal during a booting process.

13. The circuit of claim 8, wherein
the timer is configured to capture the counted values in response to the plurality of first transition edges and the plurality of second transition edges of the received signal during a booting process.

14. The circuit of claim 13, wherein the non-volatile memory is configured to store the software codes to be executed by the processor during a booting process.

15. A circuit, comprising:
a processor; and
a non-volatile memory configured to store software codes to be executed by a processor:
to cause a timer that counts based on a clock signal to capture counted values in response to first transition edges and second transition edges of a received signal transmitted from an external device;
to determine a plurality of counted numbers corresponding to a plurality of pre-known number of symbols between the first transition edges and the second transition edges; and
to cause a baud rate configuration to be determined based on an average ratio of the plurality of counted numbers and the plurality of pre-known number of symbols.

16. The circuit of claim 15, wherein the non-volatile memory is configured to store the software codes to be executed by the processor to cause another non-volatile memory to be updated according to the communication with the external device.

17. The circuit of claim 15, wherein the interface circuit is a universal asynchronous receiver/transmitter (UART) interface.

* * * * *